United States Patent [19]

Gagliardi, Jr.

[11] Patent Number: 5,932,278
[45] Date of Patent: Aug. 3, 1999

[54] METHOD OF MAKING TURKEY PRODUCTS FROM TURKEY BREAST BY SELECTIVE CUTTING AND TRIMMING OF THE BREAST TO FORM STEAK-LIKE PRODUCTS

[75] Inventor: Eugene D. Gagliardi, Jr., Atglen, Pa.

[73] Assignee: Visionary Design, Inc., Atglen, Pa.

[21] Appl. No.: 08/828,863

[22] Filed: Mar. 31, 1997

[51] Int. Cl.[6] ...................................................... A23L 1/315

[52] U.S. Cl. .......................... 426/644; 426/518; 452/135; 452/136; 452/149

[58] Field of Search .................................... 426/644, 518; 452/135, 136, 149

[56] References Cited

U.S. PATENT DOCUMENTS 5,314,374   5/1994   Koch et al. .............................. 452/149

OTHER PUBLICATIONS

Rombauer et al, "Joy of Cooking", Bobbs–Merrill Co., Inc. N.Y. pp. 451–454, 1975.

Cutler, C, "Haute Cuisine" Clarkson N. Potter, Inc., N.Y. p. 102, 1973.

Primary Examiner—Helen Pratt
Attorney, Agent, or Firm—Panitch Schwarze Jacobs & Nadel, P.C.

[57] ABSTRACT

A method of cutting a boneless turkey breast into a plurality of individual turkey products which resemble different types of steak products, includes the steps of cutting the breast along a natural seam into a thick portion and a thin portion, removing the silver from the thin portion to create a turkey product which physically resembles and tastes like a sirloin strip steak, cutting off the ends from the thick portion and further cutting the separated ends into cube-shaped pieces suitable for use as kebabs, and cutting the remaining part of the thick portion perpendicular to the grain into about one inch thick pieces to form turkey products which resemble filet mignon, eye steaks or medallions. Pound for pound, the total perceived value of the resulting turkey products is higher than the total perceived value of the original uncut turkey breast.

10 Claims, 6 Drawing Sheets

METHOD OF MAKING TURKEY PRODUCTS FROM TURKEY BREAST BY SELECTIVE CUTTING AND TRIMMING OF THE BREAST TO FORM STEAK-LIKE PRODUCTS

BACKGROUND OF THE INVENTION

The present invention relates generally to a method of cutting a boneless turkey breast into a plurality of different turkey product parts.

FIG. 1 shows a typical uncooked boneless turkey breast 10 after it has been removed from turkey. The outer yellow skin has been removed. Each turkey breast 10 is often referred to as one-half the entire turkey breast. The turkey breast 10 has a thick lobe portion 12, referred to as the "eye of the breast", and a thin lobe portion 14. The two lobe portions 12 and 14 are separated by, and connected along, a natural seam 16. The thick lobe portion 12 has an outside surface 18 and an inside surface 20. The thin lobe portion 14 also has an outside surface 22 and an inside surface 24. In FIG. 1, the outside surfaces 18 and 22 face upward. The outside surfaces 18 and 22 are generally covered by a thin pearlescent membrane or silver skin 25. The thick lobe portion 12 has a front end 26 and a back end 28. In FIG. 1, the front end 26 is on the left side and the back end 28 is on the right side. The back end 28 comes generally to a point 30 when viewed in two dimensions, whereas the front end 26 comes to a generally rounded edge 32 when viewed in two dimensions. The thick lobe portion 12 may be defined as having a longitudinal axis $L_1$ extending between the front and back ends 26 and 28. The grain of the turkey meat is oriented generally parallel to the axis $L_1$. Likewise, the thin lobe portion 14 has a front end 34 and a back end 36. In FIG. 1, the front end 34 is on the left side and the back end 36 is on the right side. The back end 36 comes generally to a point 38 when viewed in two dimensions, whereas the front end 34 comes to a generally rounded edge 40 when viewed in two dimensions.

Boneless turkey breasts such as illustrated by breast 10 may be cooked in many different ways, such as by oven roasting, baking, broiling, steaming, or the like. The emphasis on healthy foods has led to an increase in the popularity of boneless turkey breasts because boneless turkey breasts consist mainly of relatively low fat white meat.

Turkey breasts are typically sold by the pound. Consumers are very price conscious when purchasing meat and poultry products and will generally resist buying such products if the price per pound is perceived to be too high. Poultry products, such as turkey, compete for the consumer's food dollar against red meat products, such as steak. Steak has traditionally been a more attractive product than poultry, even though whole boneless turkey breasts are usually a better food value because there is little or no waste, either from inedible parts or from trimmed off fat. Nonetheless, consumers resist purchasing whole, boneless turkey breasts if the "per pound" price is too high. This fact ultimately limits the profit per pound that turkey growers, distributors, butchers, and retail outlets can derive from a slaughtered turkey.

Furthermore, many consumers resist purchasing whole boneless turkey breasts altogether because they do not know how to prepare or cook such a large piece of meat.

Accordingly, there is a need for a method of increasing the perceived commercial value and usefulness of a boneless turkey breast so as to increase the potential "per pound" profit of a breast, while also expanding the market for boneless turkey breasts to new consumers. The present invention fulfills such needs by providing a method for cutting the turkey breast to form a plurality of individual turkey products which resemble different types of steak products, wherein the total perceived value of the turkey products is higher than the total perceived value of the original whole turkey breast.

BRIEF SUMMARY OF THE INVENTION

A method is disclosed of cutting a boneless turkey breast into a plurality of individual turkey products. The method comprises the steps of cutting the breast along a natural seam into two separate portions (a thick lobe portion and a thin lobe portion), and removing substantially all of the silver from the outside of the thin lobe portion. The resultant thin lobe portion comprises a turkey product resembling sirloin strip steak.

In another embodiment of the invention, the ends of the thick lobe portion are removed, and the remainder of the thick lobe portion is cut into a plurality of separate pieces which resemble either filet mignon, eye steaks or medallions. The ends are cubed and used as kabobs.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
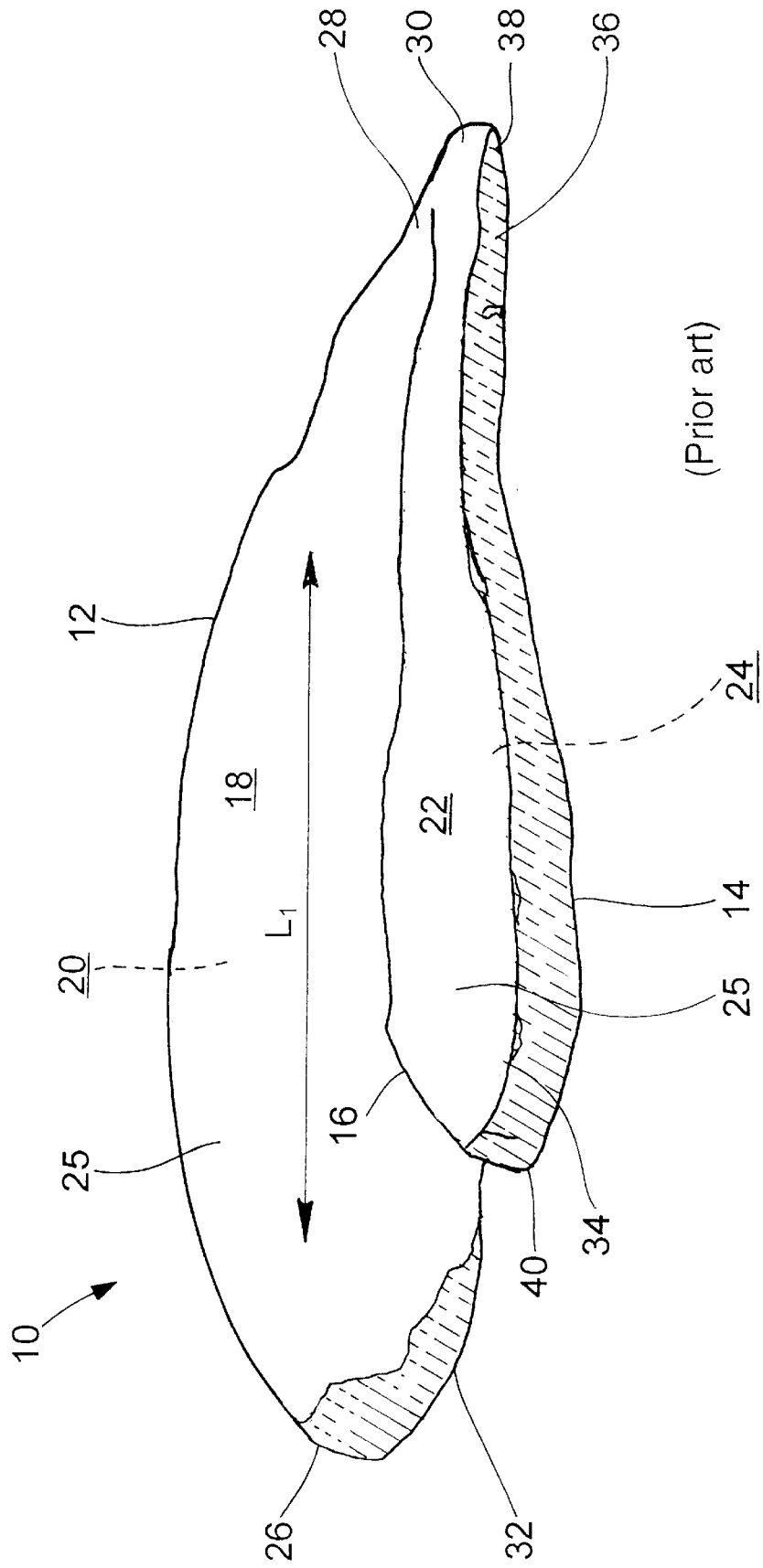
FIG. 1 is a perspective view of a prior art uncooked, boneless turkey breast.

Certain terminology is used herein for convenience only and is not be taken as a limitation on the present invention. In the drawings, the same reference numerals are employed for designating the same elements throughout the several figures.

FIGS. 2, 3, 4A, 4B, 5 and 7 illustrate, in a stepwise manner, the method of cutting the turkey breast 10 of FIG. 1 to form a plurality of turkey products. All of the cutting steps are preferably performed with a sharp knife but could be performed using some other sharp manual cutting instrument or using a saw or other power cutting device.

Figure 2:
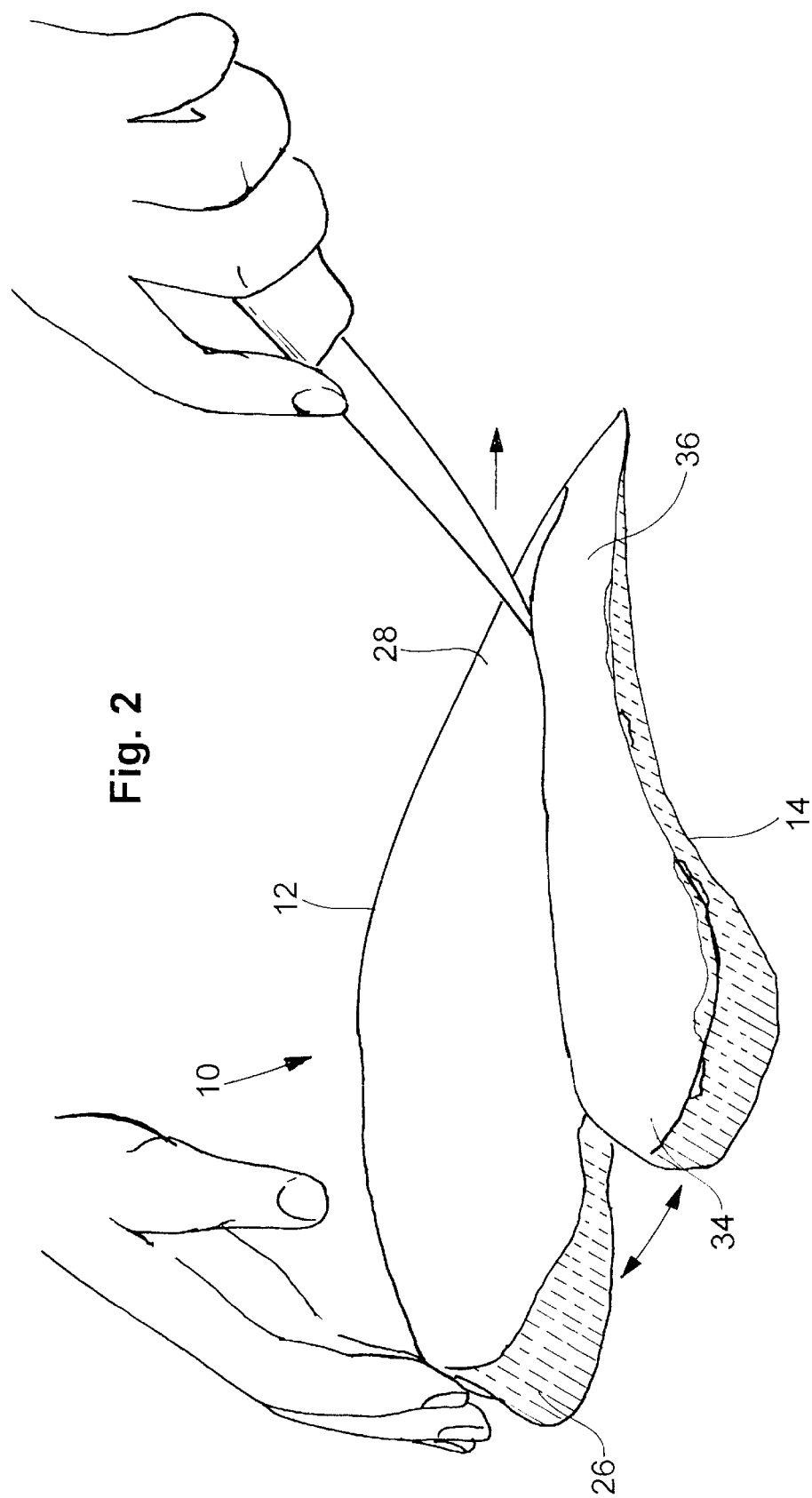
FIG. 2 is a perspective view of the step in the process of the present invention for cutting the turkey breast of FIG. 1 into thick and thin lobe portions.

FIG. 2 shows the first step in the process which is to cut the breast 10 along the natural seam 16 into two separate parts, the thick lobe portion 12 and the thin lobe portion 14. The cut is preferably made from the front ends 26, 34 to the back ends 28, 36 of the respective portions 12, 14, although the cut may alternatively be made in the reverse direction or in another suitable manner. The cut is made by following the natural seam 16 from one end to the other end.

Figure 3:
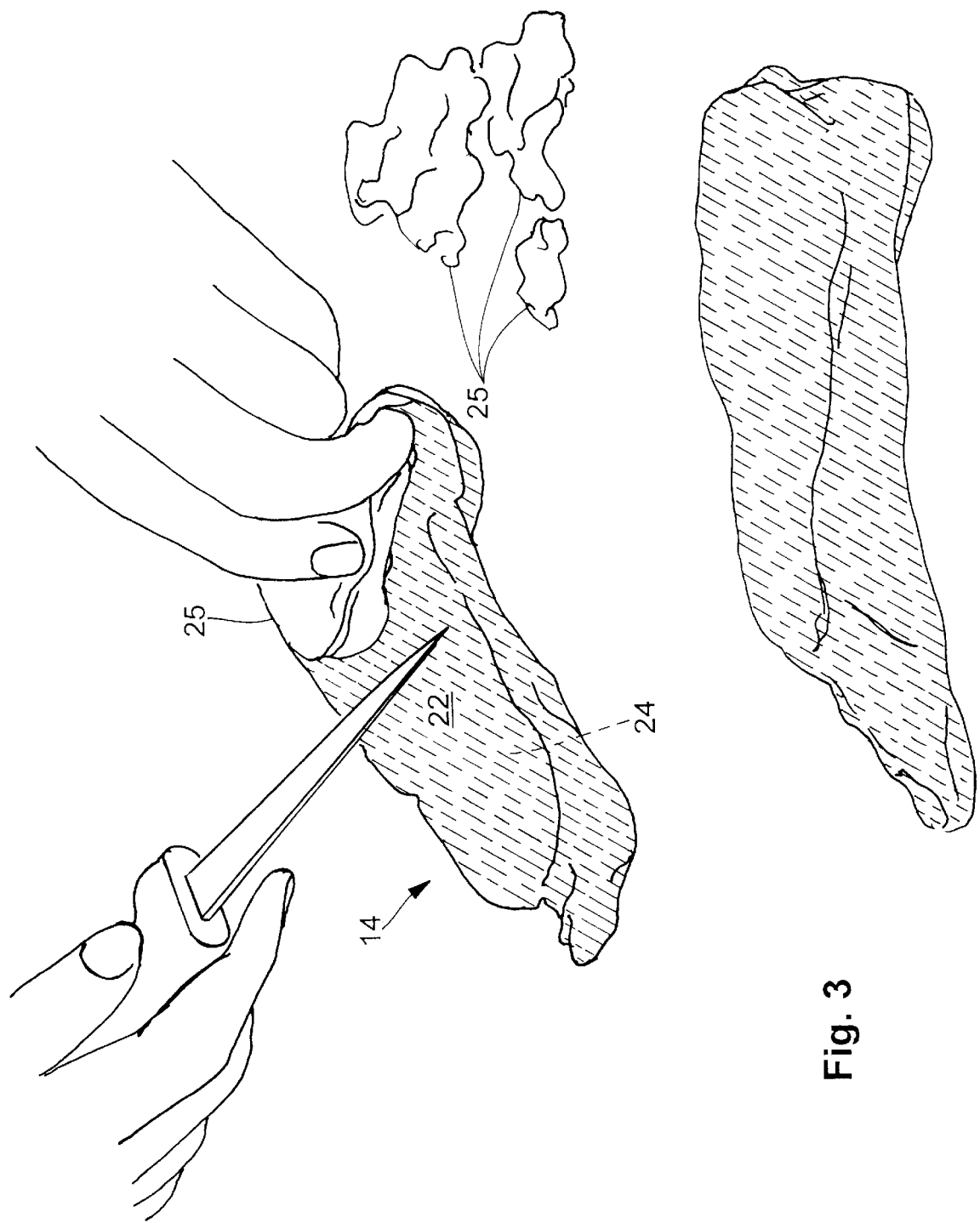
FIG. 3 is a perspective view of the thin lobe portion of FIG. 2 showing the thin lobe portion being made into a first steak-like product.

FIG. 3 shows the second step in the process. The thin lobe portion 14 is placed on a flat supporting surface with the outside surface 22 facing up, and the inside surface 24 against the flat supporting surface. A knife is used to remove the silver skin and any remaining skin, membrane, or other undesirable components (the silver skin 25 and any remaining skin, membrane, or other undesirable components collectively referred to herein as "silver 25") from the outside surface 22 and any remaining silver along the outer periphery in a manner well known to those skilled in the art. The silver 25 may be removed by a mechanical membrane skinner, instead of a knife. To remove the silver 25, small cuts are made generally parallel to the surface of the thin lobe portion 14. The resultant thin lobe portion 14 is about ¾ inch to 1 inch thick. The resultant thin lobe portion 14 comprises a turkey product that resembles a sirloin strip steak, and may be grilled or otherwise cooked like a strip steak. The turkey product 14 has a texture or consistency, when cooked that resembles the texture or consistency of a strip steak so that the turkey product 14 "eats" just like a strip steak. When cooked, the turkey product 14 actually tastes like steak, instead of turkey.

Figure 4A:
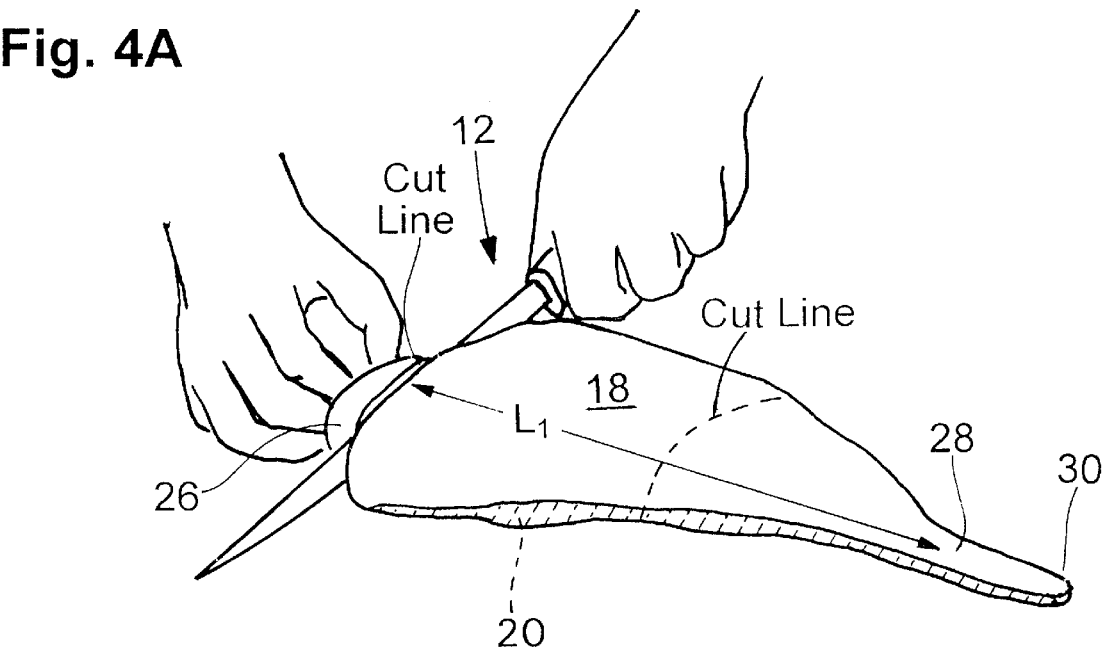
FIGS. 4A and 4B are perspective views of the thick lobe portion of FIG. 2 showing initial step in cutting this portion into a second and a third steak-like products.
Figure 4B:
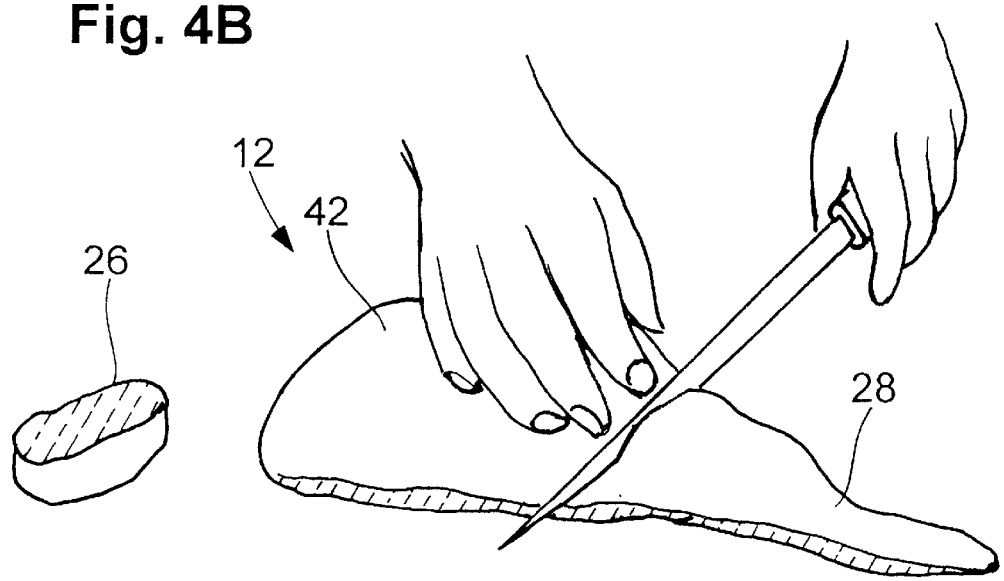

FIGS. 4A and 4B show the third step in the process. Referring to both figures, the thick lobe portion 12 is placed on a flat supporting surface with the outside surface 18 facing up, and the inside surface 20 against the flat supporting surface. The front end 26 and the back end 28 are cut from the thick lobe portion 12 along cut lines shown in FIG. 4A leaving a remaining part or middle part 42. The cutoff ends are referred to herein as "turkey tenders." The cut lines are selected so that the cross-section of the middle part 42 is generally the same size. As discussed above, the turkey breast has a natural grain which is oriented generally along the longitudinal axis $L_1$ between the front and back ends 26 and 28. The cut lines for removing the front and back ends 26, 28 are generally perpendicular to this axis, or across the grain of the breast. The cut line for removing the back end 28 defines a generally triangular shape for the back end 28.

Figure 5:
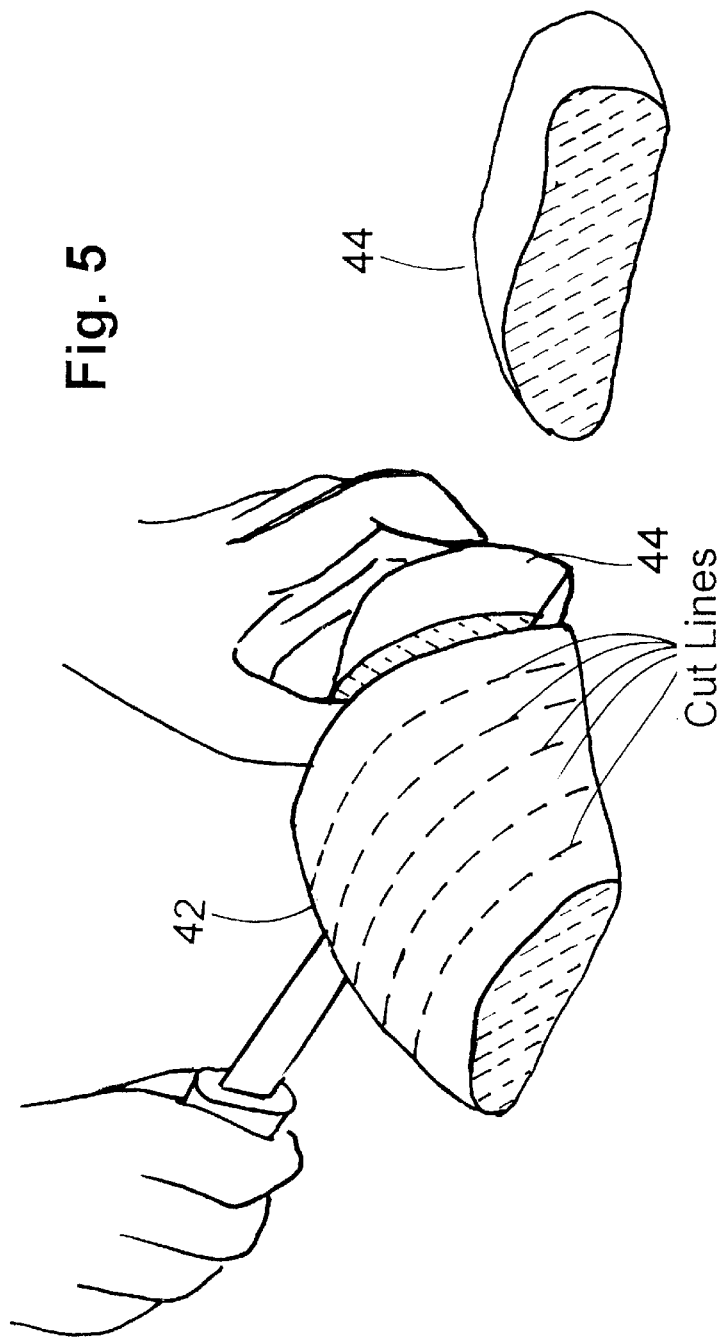
FIG. 5 is a perspective view of a middle part of the thick lobe portion showing the middle portion being cut into second steak-like products.
Figure 6:
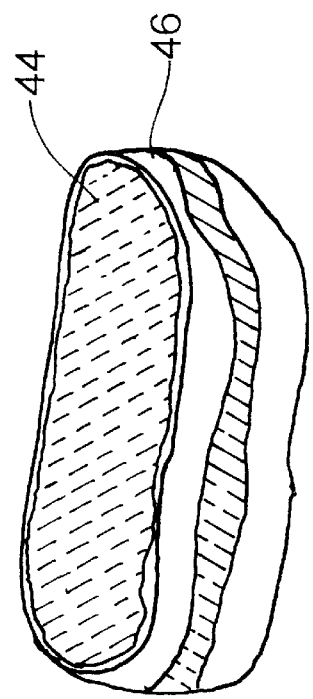
FIGS. 6 is a perspective view of a bacon-wrapped second steak-like product formed from the middle part of the thick lobe portion of FIG. 5.

FIG. 5 shows the fourth step in the process. The middle part 42 of the thick lobe portion 12 is cut across the grain of the turkey meat (i.e., perpendicular to the longitudinal axis $L_1$ shown in FIG. 4A) along generally evenly spaced cut lines into a plurality of separate pieces 44. In FIG. 5, two pieces have been cut from the middle part 42. The distance between the cut lines depends upon the desired thickness of the separate pieces 44. If the separate pieces 44 are to be grilled, a suitable thickness is about one inch to about one and a half inches. The pieces 44 generally resemble either filet mignon, eye steaks or medallions and may be cooked and eaten in the same way. The pieces 44 may be cooked, as is. Alternatively, as shown in FIG. 6, a piece of bacon 46 may be wrapped around the circumference prior to cooking to enhance the flavor of the piece 44. The piece 44 is then cooked with bacon 46 attached thereto. The bacon 46 may be regular bacon or turkey bacon. When cooked, the pieces 44 actually taste like steak, instead of turkey.

Figure 7:
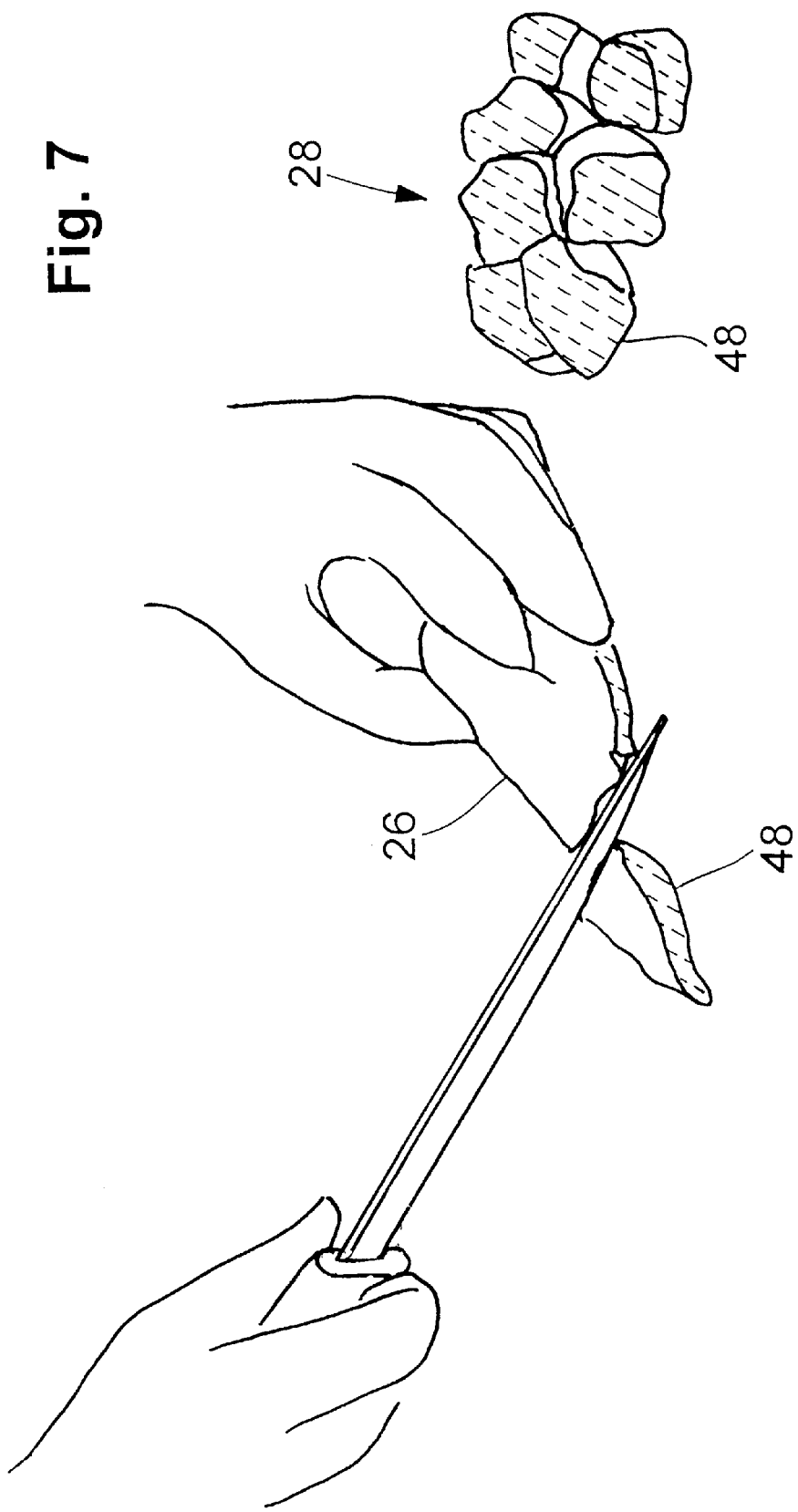
FIG. 7 is a perspective view of the third steak-like product formed from ends cut of the thick lobe portion, as shown in FIGS. 4A and 4B.

FIG. 7 shows the fifth step in the process. The cut off front and back ends 26 and 28 shown in FIG. 4B are cut into generally cube-shaped pieces 48 suitable for use as kabobs (kebabs). FIG. 7 shows the front end 26 and back end 28 cut into such pieces 48. One suitable piece size for kabobs is 1 ¼ inch cubes. The pieces resemble beef cubes.

The cutting steps as described and shown need not be performed in the exact order described above. For example, once the two lobe portions are separated, the thick lobe portion 12 may be further cut before the thin lobe portion 14 is cut. Furthermore, all of the steps need not be performed. Once the thin lobe portion 14 is cut to resemble a sirloin strip steak, the thick lobe portion 12 may be left as is, and sold or cooked as a part of a single, smaller boneless turkey breast.

Assuming that the turkey breast is cut into all of the steak-like turkey products, a preferred cooking method for using all of the pieces is grilling. However, other methods for cooking poultry products, as discussed above, may be used instead.

By cutting a whole boneless turkey breast into the described turkey products, butchers and supermarkets may interest new consumers to buy turkey products. Consumers are usually familiar with methods of preparing meat and steak products, and may be willing to try turkey products which physically resemble and "eat" like such steak products and which are cooked in the same manner as the steak products.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of cutting a boneless turkey breast into a plurality of individual turkey products, the method comprising the steps of:

(a) cutting the breast along a natural seam into two separate portions, a thick lobe portion and a thin lobe portion; and (b) removing substantially all of the silver from the outside of the thin lobe portion, the resultant thin lobe portion comprising a turkey product resembling sirloin strip steak.

2. A method according to claim 1, wherein the thick lobe portion has a longitudinal axis generally parallel to the grain, the method further comprising the steps of:

(c) cutting the thick lobe portion generally perpendicular to the longitudinal axis into a plurality of separate pieces, at least some of the pieces comprising a turkey product resembling either filet mignon, eye steaks or medallions.

3. A method according to claim 2 further comprising:

(d) cooking the plurality of separate pieces.

4. A method according to claim 1 wherein the thick lobe portion has a front end and a rear end, and a longitudinal axis generally parallel to the grain, the method further comprising the steps of:

(c) cutting the thick lobe portion generally perpendicular to the longitudinal axis to remove the front end and the rear end; and (d) cutting the remainder of the thick lobe portion generally perpendicular to the longitudinal axis into a plurality of separate pieces comprising a turkey product resembling either filet mignon, eye steaks or medallions.

5. A method according to claim 4 wherein step (c) includes cutting the remaining part at about one inch to about one and a half inch intervals so that each of the plurality of separate pieces has a thickness of about one inch to about one and a half inches.

6. A method according to claim 3 wherein step (d) is performed by grilling.

7. A method according to claim 4 further comprising the step of:
(e) cutting the front end and the rear end into a plurality of generally cube-shaped pieces suitable for use as kabobs.

8. A method according to claim 4 further comprising the step of:
(e) wrapping a piece of bacon around the circumference of each of the plurality of separate pieces which resemble either filet mignon, eye steaks or medallions.

9. A method according to claim 1 further comprising:
(c) cooking the resultant thin lobe portion.

10. A method according to claim 9 wherein step (c) is performed by grilling.

* * * * *